(12) United States Patent
Mandalia et al.

(10) Patent No.: US 9,055,150 B2
(45) Date of Patent: Jun. 9, 2015

(54) SKILLS BASED ROUTING IN A STANDARDS BASED CONTACT CENTER USING A PRESENCE SERVER AND EXPERTISE SPECIFIC WATCHERS

(75) Inventors: Baiju D. Mandalia, Boca Raton, FL (US); Victor S. Moore, Lake City, FL (US); Wendi L. Nusbickel, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2289 days.

(21) Appl. No.: 11/680,839

(22) Filed: Mar. 1, 2007

(65) Prior Publication Data

US 2008/0205628 A1    Aug. 28, 2008

Related U.S. Application Data

(63) Continuation-in-part of application No. 11/680,304, filed on Feb. 28, 2007.

(51) Int. Cl.
*H04M 3/00*    (2006.01)
*H04M 3/523*   (2006.01)
(Continued)

(52) U.S. Cl.
CPC ........ *H04M 3/5233* (2013.01); *H04M 3/42102* (2013.01); *H04M 3/42365* (2013.01);
(Continued)

(58) Field of Classification Search
CPC .......... H04M 3/5233; H04M 3/42365; H04M 3/5183; H04M 3/5232; H04M 3/42374; H04L 67/24; H04L 12/581; H04L 51/04; H04L 29/06027
USPC ......... 370/401, 352, 260, 356, 353, 354, 355, 370/357; 709/227; 379/114.01, 265, 266, 379/272, 273, 221.01, 221.06, 221.14
See application file for complete search history.

(56) References Cited

U.S. PATENT DOCUMENTS 5,278,943 A    1/1994   Casper et al.
5,774,551 A    6/1998   Wu et al.
(Continued)

FOREIGN PATENT DOCUMENTS

CN    1697419    11/2005
EP    1199872    4/2002
(Continued)

OTHER PUBLICATIONS

Keidl, M., et al., "Flexible and Reliable Web Service Execution," [online] Proc. of Workshop on Entwicklung von Anwendungen auf der Basis der XML Web-Service Technologies, retrieved from the Internet: <http:/citeseerx.ist.psu.edu/viewdoc/summary?doi=10.1.1. 8.8890>.
(Continued)

*Primary Examiner* — Ahmad F Matar
*Assistant Examiner* — Kharye Pope
(74) *Attorney, Agent, or Firm* — Patents on Demand P.A.; Brian K. Buchheit; Scott M. Garrett

(57) ABSTRACT

The present invention discloses a presence management system for a contact center including a presence server, a data store, and one or more watchers. The presence server can accept, manage, and distribute presence information using Session Initiation Protocol (SIP) based messages in conformance with an open standard, such as an Internet Engineering Task Force (IETF) based standard. The data store can be communicatively linked to the presence server and can be configured to store the presence information. The stored presence information can include presence information for multiple contact center agents, wherein for each agent the stored presence information includes an element for expertise of the associated agent. The watchers can subscribe to the presence information managed by the presence server. Each of the watchers can correspond to a unique expertise. The watcher associated with an expertise can watch presence information for all of the contact center agents having that expertise.

18 Claims, 3 Drawing Sheets

(51) Int. Cl.
  *H04L 29/06* (2006.01)
  *H04L 29/08* (2006.01)
  *H04M 5/00* (2006.01)
  *H04L 12/66* (2006.01)
  *H04M 3/42* (2006.01)
  *H04M 3/51* (2006.01)
  *H04M 7/00* (2006.01)

(52) U.S. Cl.
  CPC ............ *H04M3/42374* (2013.01); *H04M 3/51* (2013.01); *H04M 3/5191* (2013.01); *H04M 7/006* (2013.01); *H04M 2203/6009* (2013.01); *H04L 65/40* (2013.01); *H04L 67/24* (2013.01)

(56) References Cited

U.S. PATENT DOCUMENTS

| | | | |
|---|---|---|---|
| 5,781,720 A | 7/1998 | Parker et al. | |
| 5,873,094 A | 2/1999 | Talatik | |
| 6,049,779 A | 4/2000 | Berkson | |
| 6,058,163 A | 5/2000 | Pattison et al. | |
| 6,195,697 B1 | 2/2001 | Bowman-Amuah | |
| 6,269,336 B1 | 7/2001 | Ladd et al. | |
| 6,272,625 B1 | 8/2001 | DeCarmo | |
| 6,298,370 B1 | 10/2001 | Tang et al. | |
| 6,301,609 B1 | 10/2001 | Aravamudan et al. | |
| 6,314,177 B1 | 11/2001 | Davis et al. | |
| 6,317,794 B1 | 11/2001 | Papierniak et al. | |
| 6,338,089 B1 | 1/2002 | Quinlan | |
| 6,351,271 B1 | 2/2002 | Mainwaning et al. | |
| 6,366,771 B1 | 4/2002 | Angle et al. | |
| 6,370,508 B2 | 4/2002 | Beck et al. | |
| 6,424,709 B1* | 7/2002 | Doyle et al. | 379/265.02 |
| 6,424,995 B1 | 7/2002 | Shuman | |
| 6,442,547 B1 | 8/2002 | Bowman-Amuah et al. | |
| 6,523,035 B1 | 2/2003 | Fleming et al. | |
| 6,587,558 B2 | 7/2003 | Lo et al. | |
| 6,606,744 B1 | 8/2003 | Mikurak | |
| 6,611,867 B1 | 8/2003 | Bowman-Amuah | |
| 6,618,490 B1 | 9/2003 | Cham et al. | |
| 6,662,340 B2 | 12/2003 | Rawat et al. | |
| 6,704,396 B2 | 3/2004 | Parolkar et al. | |
| 6,724,403 B1 | 4/2004 | Santoro et al. | |
| 6,735,566 B1 | 5/2004 | Brand | |
| 6,757,362 B1 | 6/2004 | Cooper et al. | |
| 6,810,429 B1 | 10/2004 | Walsh et al. | |
| 6,895,084 B1 | 5/2005 | Saylor et al. | |
| 6,898,277 B1 | 5/2005 | Meteer et al. | |
| 6,898,658 B2 | 5/2005 | Toguchi et al. | |
| 6,910,074 B1 | 6/2005 | Amin et al. | |
| 6,922,466 B1 | 7/2005 | Peterson et al. | |
| 6,970,554 B1 | 11/2005 | Peterson et al. | |
| 6,972,761 B1 | 12/2005 | Cox et al. | |
| 6,978,247 B1 | 12/2005 | Bogart et al. | |
| 6,988,126 B2 | 1/2006 | Wilcock et al. | |
| 6,996,605 B2 | 2/2006 | Low et al. | |
| 7,003,079 B1 | 2/2006 | McCarthy et al. | |
| 7,006,605 B1 | 2/2006 | Morganstein et al. | |
| 7,023,840 B2 | 4/2006 | Golla et al. | |
| 7,085,728 B2 | 8/2006 | Sarlay et al. | |
| 7,149,798 B2 | 12/2006 | Rezvani et al. | |
| 7,177,881 B2 | 2/2007 | Schwesig et al. | |
| 7,203,907 B2 | 4/2007 | Weng et al. | |
| 7,210,098 B2 | 4/2007 | Sibal et al. | |
| 7,233,933 B2 | 6/2007 | Horvitz et al. | |
| 7,286,840 B2 | 10/2007 | Jaim | |
| 7,315,616 B2 | 1/2008 | Annadata et al. | |
| 7,330,487 B2 | 2/2008 | Chang et al. | |
| 7,334,018 B2 | 2/2008 | Elms | |
| 7,336,628 B2 | 2/2008 | Chang et al. | |
| 7,337,405 B2 | 2/2008 | Weng et al. | |
| 7,356,567 B2 | 4/2008 | Odell et al. | |
| 7,382,868 B2* | 6/2008 | Moore et al. | 379/114.01 |
| 7,386,467 B2 | 6/2008 | Eitel et al. | |
| 7,418,094 B2 | 8/2008 | Golitsin et al. | |
| 7,441,261 B2 | 10/2008 | Slater et al. | |
| 7,499,458 B2 | 3/2009 | McDysan et al. | |
| 7,506,368 B1 | 3/2009 | Kersey et al. | |
| 7,525,937 B2 | 4/2009 | O'Neill | |
| 7,567,662 B1 | 7/2009 | Renner et al. | |
| 7,644,351 B1 | 1/2010 | Portnoy et al. | |
| 7,739,115 B1 | 6/2010 | Pettay et al. | |
| 2001/0027474 A1 | 10/2001 | Nachman et al. | |
| 2001/0034738 A1 | 10/2001 | Cantwell et al. | |
| 2001/0052023 A1 | 12/2001 | Lin et al. | |
| 2002/0016736 A1 | 2/2002 | Cannon et al. | |
| 2002/0018464 A1* | 2/2002 | Kikinis | 370/352 |
| 2002/0052932 A1 | 5/2002 | Curtis et al. | |
| 2002/0055350 A1 | 5/2002 | Gupte et al. | |
| 2002/0055967 A1 | 5/2002 | Coussement | |
| 2002/0056000 A1 | 5/2002 | Coussement | |
| 2002/0089539 A1 | 7/2002 | Lindhorst et al. | |
| 2002/0099602 A1 | 7/2002 | Moskowitz et al. | |
| 2002/0103867 A1 | 8/2002 | Schilter | |
| 2002/0105909 A1 | 8/2002 | Flanagan et al. | |
| 2002/0120674 A1 | 8/2002 | Son et al. | |
| 2002/0140731 A1 | 10/2002 | Subramaniam et al. | |
| 2002/0154162 A1 | 10/2002 | Bhatia et al. | |
| 2002/0169613 A1 | 11/2002 | Damiba | |
| 2002/0174170 A1 | 11/2002 | Loffe et al. | |
| 2002/0184346 A1 | 12/2002 | Mani | |
| 2002/0184373 A1 | 12/2002 | Maes | |
| 2002/0184610 A1 | 12/2002 | Chong et al. | |
| 2002/0187750 A1 | 12/2002 | Majumdar | |
| 2002/0194388 A1 | 12/2002 | Boloker et al. | |
| 2003/0007606 A1 | 1/2003 | Suder et al. | |
| 2003/0021264 A1* | 1/2003 | Zhakov et al. | 370/352 |
| 2003/0023953 A1 | 1/2003 | Lucassen et al. | |
| 2003/0026269 A1 | 2/2003 | Paryani | |
| 2003/0040995 A1 | 2/2003 | Daddario et al. | |
| 2003/0041108 A1 | 2/2003 | Henrick et al. | |
| 2003/0046088 A1 | 3/2003 | Yuschik | |
| 2003/0055884 A1 | 3/2003 | Yuen et al. | |
| 2003/0088421 A1 | 5/2003 | Maes et al. | |
| 2003/0095540 A1 | 5/2003 | Mulligan et al. | |
| 2003/0099343 A1* | 5/2003 | Dezonno | 379/265.11 |
| 2003/0108063 A1 | 6/2003 | Joseph et al. | |
| 2003/0110297 A1 | 6/2003 | Tabatabai et al. | |
| 2003/0120813 A1 | 6/2003 | Majumdar et al. | |
| 2003/0156706 A1 | 8/2003 | Koehler et al. | |
| 2003/0182622 A1 | 9/2003 | Sibal et al. | |
| 2003/0187944 A1 | 10/2003 | Johnson et al. | |
| 2003/0204561 A1 | 10/2003 | Briscoe et al. | |
| 2003/0212762 A1 | 11/2003 | Barnes et al. | |
| 2003/0223381 A1 | 12/2003 | Schroderus | |
| 2004/0005048 A1* | 1/2004 | Agusta | 379/265.12 |
| 2004/0039795 A1 | 2/2004 | Percival | |
| 2004/0054740 A1 | 3/2004 | Daigle et al. | |
| 2004/0057572 A1* | 3/2004 | O'Connor et al. | 379/266.01 |
| 2004/0078787 A1 | 4/2004 | Borek et al. | |
| 2004/0080535 A1 | 4/2004 | Lueckhoff et al. | |
| 2004/0100529 A1 | 5/2004 | Silverbrook | |
| 2004/0104938 A1 | 6/2004 | Saraswat et al. | |
| 2004/0128342 A1 | 7/2004 | Maes et al. | |
| 2004/0133888 A1 | 7/2004 | Ard et al. | |
| 2004/0141508 A1* | 7/2004 | Schoeneberger et al. | 370/401 |
| 2004/0146010 A1 | 7/2004 | Gass et al. | |
| 2004/0162726 A1 | 8/2004 | Chang | |
| 2004/0172254 A1 | 9/2004 | Sharma et al. | |
| 2004/0172258 A1 | 9/2004 | Dominach et al. | |
| 2004/0181461 A1 | 9/2004 | Raiyani et al. | |
| 2004/0199574 A1 | 10/2004 | Franco et al. | |
| 2004/0205614 A1 | 10/2004 | Keswa | |
| 2004/0208307 A1 | 10/2004 | Walker et al. | |
| 2004/0215824 A1 | 10/2004 | Payrits | |
| 2004/0218751 A1 | 11/2004 | Colson et al. | |
| 2004/0230466 A1 | 11/2004 | Davis et al. | |
| 2004/0239754 A1 | 12/2004 | Shachar | |
| 2004/0250201 A1 | 12/2004 | Caspi | |
| 2004/0254957 A1 | 12/2004 | Hyotyniemi et al. | |
| 2004/0255030 A1 | 12/2004 | Sillanpaa | |
| 2005/0021826 A1 | 1/2005 | Kumar | |
| 2005/0027495 A1 | 2/2005 | Matichuk | |
| 2005/0047579 A1 | 3/2005 | Salame | |

(56) References Cited

U.S. PATENT DOCUMENTS

| | | |
|---|---|---|
| 2005/0060138 A1 | 3/2005 | Wang et al. |
| 2005/0069225 A1 | 3/2005 | Schneider et al. |
| 2005/0074101 A1* | 4/2005 | Moore et al. ............. 379/114.01 |
| 2005/0102606 A1 | 5/2005 | Sasaki et al. |
| 2005/0105712 A1 | 5/2005 | Williams et al. |
| 2005/0125541 A1 | 6/2005 | Frank et al. |
| 2005/0129198 A1 | 6/2005 | Sudhir et al. |
| 2005/0132023 A1 | 6/2005 | Cazzolla et al. |
| 2005/0136897 A1 | 6/2005 | Praveenkumar et al. |
| 2005/0137875 A1 | 6/2005 | Kim et al. |
| 2005/0147216 A1 | 7/2005 | Janakiraman et al. |
| 2005/0152522 A1 | 7/2005 | Kumhyr |
| 2005/0172331 A1 | 8/2005 | Blackketter et al. |
| 2005/0195823 A1 | 9/2005 | Chen et al. |
| 2005/0198099 A1 | 9/2005 | Motsinger et al. |
| 2005/0203944 A1 | 9/2005 | Dinh et al. |
| 2005/0232408 A1* | 10/2005 | Hodson et al. ........... 379/265.02 |
| 2005/0251393 A1 | 11/2005 | Georgescu |
| 2005/0261909 A1 | 11/2005 | Sienel et al. |
| 2005/0278444 A1 | 12/2005 | Sims et al. |
| 2005/0283364 A1 | 12/2005 | Longe et al. |
| 2005/0286705 A1 | 12/2005 | Contolini et al. |
| 2005/0286707 A1 | 12/2005 | Erhart et al. |
| 2006/0015600 A1 | 1/2006 | Piper |
| 2006/0023864 A1 | 2/2006 | Krahn |
| 2006/0023865 A1 | 2/2006 | Nice et al. |
| 2006/0031077 A1 | 2/2006 | Dalton et al. |
| 2006/0036770 A1 | 2/2006 | Hosn et al. |
| 2006/0069563 A1 | 3/2006 | Ju et al. |
| 2006/0074980 A1 | 4/2006 | Sarkar |
| 2006/0101143 A1 | 5/2006 | Garcia et al. |
| 2006/0104433 A1 | 5/2006 | Simpson et al. |
| 2006/0112400 A1 | 5/2006 | Zhang et al. |
| 2006/0115074 A1* | 6/2006 | Hollatz et al. ........... 379/265.09 |
| 2006/0126816 A1 | 6/2006 | Shaffer et al. |
| 2006/0165060 A1* | 7/2006 | Dua ............................. 370/352 |
| 2006/0168002 A1 | 7/2006 | Chesley |
| 2006/0176901 A1 | 8/2006 | Terai et al. |
| 2006/0182258 A1 | 8/2006 | Sisselman et al. |
| 2006/0190580 A1 | 8/2006 | Shu et al. |
| 2006/0195584 A1 | 8/2006 | Baumann |
| 2006/0200569 A1 | 9/2006 | Koch et al. |
| 2006/0200754 A1 | 9/2006 | Kablesh et al. |
| 2006/0209794 A1* | 9/2006 | Bae et al. ...................... 370/352 |
| 2006/0212511 A1 | 9/2006 | Garcia-Martin |
| 2006/0282856 A1 | 12/2006 | Errico et al. |
| 2006/0287866 A1 | 12/2006 | Cross et al. |
| 2007/0005990 A1 | 1/2007 | Sathish |
| 2007/0026852 A1 | 2/2007 | Logan et al. |
| 2007/0047715 A1 | 3/2007 | Madhusudan et al. |
| 2007/0049281 A1 | 3/2007 | Chen et al. |
| 2007/0071224 A1 | 3/2007 | Shtivelman et al. |
| 2007/0081557 A1 | 4/2007 | Binetti et al. |
| 2007/0100981 A1 | 5/2007 | Adamczyk et al. |
| 2007/0109979 A1 | 5/2007 | Fu et al. |
| 2007/0116223 A1 | 5/2007 | Burke et al. |
| 2007/0124507 A1 | 5/2007 | Gurram et al. |
| 2007/0132834 A1 | 6/2007 | DaPalma et al. |
| 2007/0133507 A1 | 6/2007 | DaPalma et al. |
| 2007/0133508 A1 | 6/2007 | DaPalma et al. |
| 2007/0133509 A1 | 6/2007 | Da Palma et al. |
| 2007/0133511 A1 | 6/2007 | DaPalma et al. |
| 2007/0133512 A1 | 6/2007 | Da Palma et al. |
| 2007/0133513 A1 | 6/2007 | Da Palma et al. |
| 2007/0133769 A1 | 6/2007 | DaPalma et al. |
| 2007/0133773 A1 | 6/2007 | Da Palma et al. |
| 2007/0136420 A1 | 6/2007 | Da Palma et al. |
| 2007/0136421 A1 | 6/2007 | DaPalma et al. |
| 2007/0136436 A1 | 6/2007 | DaPalma et al. |
| 2007/0136442 A1 | 6/2007 | DaPalma et al. |
| 2007/0136448 A1 | 6/2007 | DaPalma et al. |
| 2007/0136449 A1 | 6/2007 | DaPalma et al. |
| 2007/0136793 A1 | 6/2007 | DaPalma et al. |
| 2007/0147355 A1 | 6/2007 | DaPalma et al. |
| 2007/0160188 A1* | 7/2007 | Sharpe et al. ............ 379/265.01 |
| 2007/0180075 A1 | 8/2007 | Chasman et al. |
| 2007/0189301 A1* | 8/2007 | Kiss et al. .................. 370/395.2 |
| 2007/0201676 A1 | 8/2007 | Gillis et al. |
| 2007/0258576 A1* | 11/2007 | Klein et al. .............. 379/265.02 |
| 2007/0266075 A1 | 11/2007 | Jachner |
| 2007/0286180 A1 | 12/2007 | Marquette et al. |
| 2007/0288247 A1 | 12/2007 | Mackay |
| 2008/0003964 A1 | 1/2008 | Alperin et al. |
| 2008/0037752 A1 | 2/2008 | Chatilov et al. |
| 2008/0071917 A1* | 3/2008 | Petrovykh .................... 709/230 |
| 2008/0086564 A1 | 4/2008 | Putman et al. |
| 2008/0120125 A1* | 5/2008 | Chavez ............................ 705/1 |
| 2008/0120164 A1* | 5/2008 | Hassler ............................ 705/9 |
| 2008/0167914 A1 | 7/2008 | Ikeda et al. |
| 2008/0183852 A1 | 7/2008 | Pramer et al. |
| 2008/0192908 A1 | 8/2008 | O'Keefe et al. |
| 2009/0254757 A1 | 10/2009 | Toyama et al. |
| 2009/0262668 A1* | 10/2009 | Hemar et al. .................. 370/260 |
| 2010/0077082 A1* | 3/2010 | Hession et al. ............... 709/227 |
| 2010/0218084 A1 | 8/2010 | Sivadas et al. |

FOREIGN PATENT DOCUMENTS

| | | |
|---|---|---|
| EP | 1237349 A2 | 9/2002 |
| EP | 1484903 A2 | 12/2004 |
| FR | 2844127 A1 | 3/2004 |
| WO | 0005903 | 2/2000 |
| WO | 0131472 | 5/2001 |
| WO | 03079144 | 9/2003 |

OTHER PUBLICATIONS

Engelsma, J., et al., Distributed Multimodal Synchronization Protocol; IETF Standard-Working Draft, Internet Engineering Task Force, IETF, CH, Jul. 8, 2005, pp. 1-71.

Georgescu, J.C., et al. "Multimodal IMS Services: The Adaptive Keyword Spotting Interaction Paradigm," [online] ICAS-ICNS 2005, Int'l Conf. Autonomic and Autonomous Systems / Int'l Conf. on Networking and Services pp. 21, 2005 [retrieved Jun. 4, 2010] retrieved from the Internet: <http://www.computer.org/portal/web/csdl/doi/10.1109/ICAS-ICNS.2005.67>.

Bodel, M., et al., "W3C Multimodal Interaction Citation," [online] May 6, 2003, pp. 1-19, XP002305381; [retrieved Jun. 4, 2010] retrieved from the Internet: <http://www.w3.org/TR/mmi-framework/.

US Pat. No. 7706521, Office Action 1, Dec. 30, 2008.
US Pat. No. 7706521, Office Action 2, Jul. 2, 2009.
US Pub. No. 20070133773, Office Action 1, Dec. 9, 2008.
US Pub. No. 20070133773, Final Office Action 1, May 29, 2009.
US Pub. No. 20070133773, Final Office Action 2, May 21, 2010.
US Pub. No. 20070133509, Office Action 1, Dec. 10, 2008.
US Pub. No. 20070133509, Final Office Action 1, Jun. 24, 2009.
US Pub. No. 20070133513, Office Action 1, Feb. 26, 2010.
US Pub. No. 2007018957 Office Action 1 (Mar. 5, 2010).

Olsson, D., et al., "MEP—A Media Event Platform", Mobile Networks and Applications, Kluwer Academic Publishers, vol. 7, No. 3, pp. 235-244, 2002.

Kimbrough, S.O., et al., "On Automated Message Processing in Electronic Commerce and Work Support Systems: Speech Act Theory and Expressive Felicity", ACM Transactions on Information Systems, vol. 15, No. 4, pp. 321-367, Oct. 1997.

Brabrand, C., et al., "The <bigwig> Project", ACM Transactions on Internet Technology, vol. 2, No. 2, pp. 79-114, May 2002.

Fielding, R.T., et al., "Principled Design of the Modern Web Architecture", ACM Transactions on Internet Technology, vol. 2, No. 2, pp. 115-150, May 2002.

Meng, H., et al., "ISIS: An Adaptive, Trilingual Conversational System With Interleaving Interaction and Delegation Dialogs", ACM Transactions on Computer Human Interaction, vol. 11, No. 3, pp. 268-299, Sep. 2004.

Atkins, D., et al., "Common Presence and Instant Messaging: Message Format," [online] Internet Engineering Task Force, IETF, CH, vol. IMPP, No. 8, Jan. 9, 2003, [retrieved on Feb. 7, 2008] retrieved from the Internet: <http://tools.ietf.org/html/draft-ietf-impp-cpim-msgfmt-08>.

(56) References Cited

OTHER PUBLICATIONS

Peterson, J., "Common Profile for Presence (CPP)," [online] Internet Engineering Task Force, IETF, CH, vol. IMPP, No. 4, Aug. 14, 2003, [retrieved on Feb. 7, 2008] retrieved from the Internet: <http://tools.ietf.org/html/draft-ietf-impp-pres-04>.

Sugano, H., et al., "Prsence Information Data Format (PIDF)," [online] Internet Engineering Task Force, IETF, CH, vol. IMPP, No. 8, May 1, 2003, [retrieved on Feb. 7, 2008] retrieved from the Internet: <http://tools.ietf.org/html/draft-ietf-impp-cpim-pidf-08>.

Schulzrinne, H., et al., "RPID: Rich Presence Extensions to the Presence Information Data Format (PIDF)," [online] Internet Engineering Task Force, IETF, CH, Jul. 1, 2006, [retrieved on Feb. 7, 2008] retrieved from the Internet: <http://www.ietf.org/rfc/rfc4480.txt>.

Notice of Allowance dated Dec. 9, 2009 in related, U.S. Appl. No. 11/684,397.

\* cited by examiner

SKILLS BASED ROUTING IN A STANDARDS BASED CONTACT CENTER USING A PRESENCE SERVER AND EXPERTISE SPECIFIC WATCHERS

CROSS-REFERENCE TO RELATED APPLICATIONS

This continuation-in-part application claims the benefit of U.S. patent application Ser. No. 11/680,304 filed 28 Feb. 2007, which is hereby incorporated by reference herein, and is related to U.S. patent application Ser. Nos. 11/615,856, 11/680,908, 11/684,286, 11/684,333, and 11/691,642.

BACKGROUND

1. Field of the Invention

The present invention relates to the field of contact center technologies and, more particularly, skills based routing in a standards based contact center using a presence server.

2. Description of the Related Art

Conventional contact centers are implemented using proprietary hardware, software, and communication protocols provided by contact center solution vendors. The various components provided by the vendors are incompatible with one another, which results in a situation where customers are locked into a particular solution and are unable to integrate technologies and/or improvements from competing vendors or independent third party developers. An inventive standards based contact center disclosed in U.S. patent application Ser. No. 11/680,304 entitled "IMPLEMENTING A CONTACT CENTER USING OPEN STANDARDS AND NON-PROPRIETARY COMPONENTS" establishes a contact center architecture that is not proprietary and which is referred to as an open contact center.

The present invention is an extension of the open contact center of U.S. patent application Ser. No. 11/680,304 that provides specific inventive details for one contemplated arrangement for implementing a skills based routing function. Specifically, the present invention utilizes an open standards based presence server to provide skills based routing capabilities, which is a technique not performed by any known contact center. Conventional contact centers rely upon proprietary code, interfaces, and protocols to perform skills based routing and do not leverage capabilities of conventional presence servers, which inherently perform many operations that are necessary when routing contact center calls to agents based on agent skills.

Additionally, no known presence server utilizes the specific technique disclosed herein, which permits the presence server to be easily integrated into an open contact center. A conventional presence server is a physical entity that centrally manages presence information for a set of users and devices to which other users and devices can subscribe. FIG. 1 (Prior Art) illustrates a conventional system 100 that includes a presence server 120. In system 100, a communication node 110 provides presence information to the presence server 120. The communication node 110 can include presentity 112 (e.g., a user) that utilizes a presence user agent 114 (PUA) (e.g., a computer, phone, or other communication device). The presence server 120 can function as either a presence agent 122 that handles received presence information and handles subscription requests or as a proxy 124 that forwards requests to other entities. Presence information about node 110 can be stored in data store 126 and can be automatically updated when status changes to presentity 112 and/or PUA 114 occur. A series of watchers 130-136 can subscribe to the presence server 120. Each watcher 130, 134 and 138 typically corresponds to a particular presentity, such as Presentity A, Presentity B, and Presentity C. Thus, a user desiring current presence information for Presentity A can query watcher 130 and a user desiring current presence information for a Presentity C can query watcher 138.

SUMMARY OF THE INVENTION

The present invention discloses a skills based routing component for a standards based contact center in accordance with an embodiment of the inventive arrangements disclosed herein. The skills based routing component can utilize a presence server to handle presence information for a plurality of contact center agents, who can log onto the standards based contact center from an agent communication node comprising a SIP based phone and/or Hypertext Transfer Protocol (HTTP) browser. The contact center components can include a portal server that serves agent specific portlets to browsers used by the agents. Additionally, each contact center agent can have at least one expertise that is needed to handle customer requests. A set of watchers can be subscribed to the presence server, where a one-to-one correspondence exists between watchers and expertise. Therefore, a single watcher can watch all agents having a particular expertise. When an agent of that expertise is needed, the watcher can be queried and an available agent (typically the agent with greatest availability/least used agent) is returned. The contact center can then transfer a caller to this watcher identified agent.

The present invention can be implemented in accordance with numerous aspects consistent with the material presented herein. For example, the present solution can include a presence management system for a contact center including a presence server, a data store, and one or more watchers. The presence server can accept, manage, and distribute presence information using Session Initiation Protocol (SIP) based messages in conformance with an open standard, such as an Internet Engineering Task Force (IETF) based standard. The data store can be communicatively linked to the presence server and can be configured to store the presence information. The stored presence information can include presence information for multiple contact center agents. Stored information for each agent can include a data element for expertise. The watchers can subscribe to the presence information managed by the presence server. Each of the watchers can correspond to a unique expertise. The watcher associated with an expertise can watch presence information for all of the contact center agents having that expertise.

Another aspect of the present invention can include a contact center including contact center components, a presence server, and one or more watchers. The contact center components can conform to open standards and can intercommunicate using open standards. The components when taken together can form an open contact center that provides automated interactive communications with callers, that provides queue management for callers waiting to communicate with live agents, and that provides skills based routing for assigning live agents to callers based upon an expertise possessed by the live agents and an expertise needed by the callers. A set of expertise categories can be defined for the skills based routing. The presence server can accept, manage, and distribute presence information related to the live agents. The watchers, which are used in providing the skills based routing function, can subscribe to the presence information managed by the presence server. A one-to-one correspondence can exist between the watchers and expertise categories.

Yet another aspect of the present invention can include a method for performing skills based routing for a contact center. In the method, a call center can interact with a caller using an automated response mechanism. During this interaction, it can be determined that the caller needs to be transferred to a live agent. An expertise needed to handle the caller can be ascertained based upon information acquired during the interacting step. One of many watchers, each corresponding to an expertise, can be selected, where the selected watcher is associated with the needed expertise. The selected watcher can identify an agent to handle the caller. The caller can then be transferred to the identified agent.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
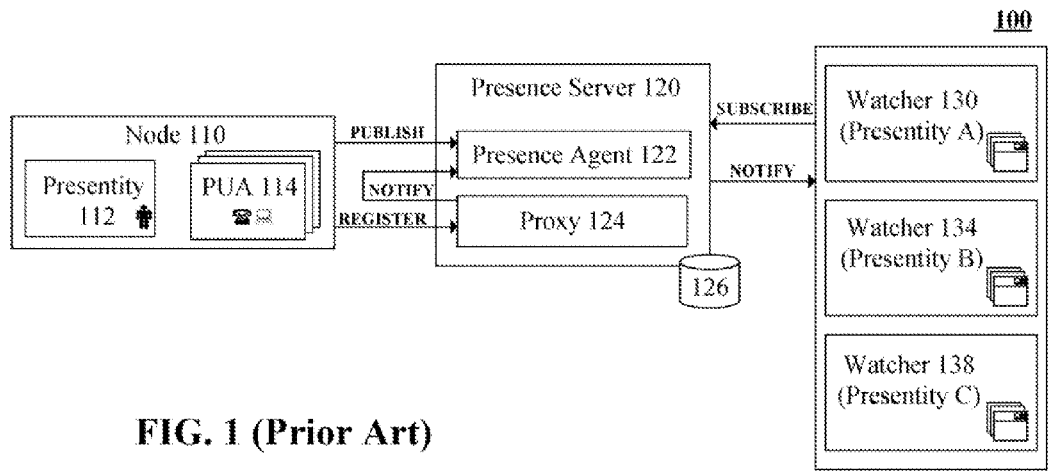
FIG. 1 (Prior Art) illustrates a conventional usage of a presence server.
Figure 2:
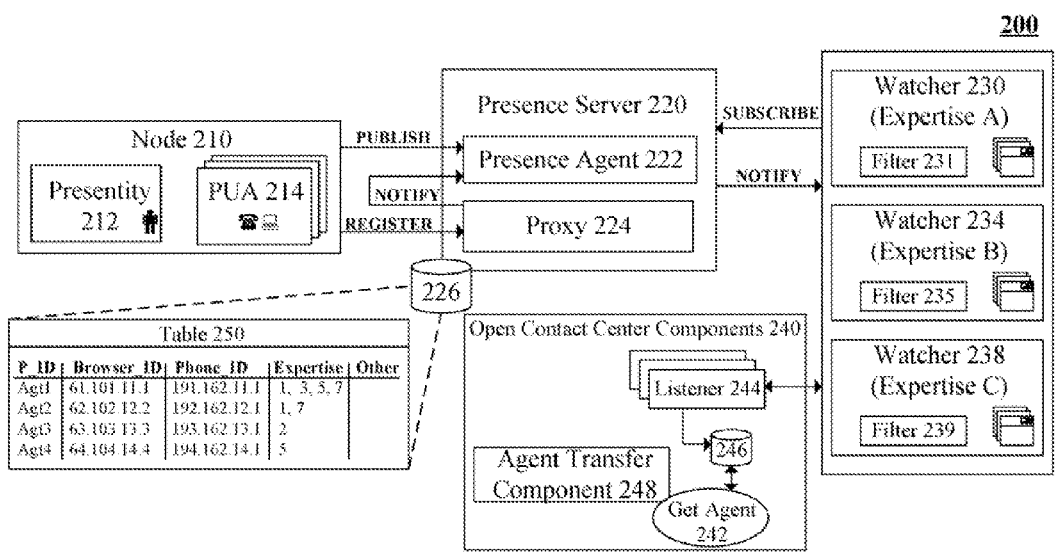
FIG. 2 is a schematic diagram of a system for using a presence server and watchers linked to agent expertise to assign contact center agents in accordance with an embodiment of the inventive arrangements disclosed herein.

FIG. 2 is a schematic diagram of a system 200 for using a presence server and watchers linked to agent expertise to assign contact center agents in accordance with art embodiment of the inventive arrangements disclosed herein. Specifically, contact center functionality can be implemented using standardized components 240, which can be components adhering to one or more open standards.

As used throughout this application, open standards indicate that specifics of communication protocols, interfaces with components 240 of an open contact center, and the like are published and available to third party vendors, who can construct solutions or enhancements to the open contact center by conforming to the published standards, such as Extensible Markup Language (XML), service-oriented architecture (SOA), Real-time Transport Protocol (RTP), Media Resource Control Protocol (MRCP), Hyper Text Transfer Protocol (HTTP), Session Initiation Protocol (SIP), and the like. Open standards are often established by an independent standard setting body, such as the Internet Engineering Task Force (IETF), World Wide Web Consortium (W3C), etc. or by a cooperating consortium of multiple independent businesses, such as IBM, Sun Microsystems, and the like. Open standards, as used herein, can exist even though one or more companies maintains intellectual property rights to open contact center concepts, such as those presented in the instant application.

The open contact center can provide mechanisms for an agent desktop, agent authentication, agent monitoring, agent transfer, application integration, call queuing, collaboration integration, load balancing, reporting, skills based routing, supervisor conferencing, and the like. The skills based routing functions can utilize the presence server 220 and watchers 230, 234, and 238.

Each of the watchers 230, 234, and 238 can be associated with a particular expertise. Further, presence information maintained by the presence server 220 in data store 226, as shown by table 250, can include an expertise element. Table 250 shows that each available live agent can be associated with one or more expertise type or category. For example, an expertise of one ("expertise=1") can represent that an agent has expertise relating to product warranties; an expertise of two ("expertise=2") can be associated with product technical problems; an expertise of three ("expertise=3") can be associated with shipping; an expertise of four ("expertise=4") can be associated with sales, and so forth. Each expertise category can have a corresponding watcher 230, 234, and 238, which monitors all live agents having that expertise. Filters 231, 235, and 239 can be used to order the live agents in a preferential manner, such as by least used agent first.

The contact center components 240 accept a call from a caller and prompt the caller for session specific information which is stored in data store 246. The prompting can indicate a live agent is needed, which causes agent transfer component 248 to invoke a get agent 24.2 function. The get agent 242 function uses listeners 244 linked to watchers 230, 234, and 238 to determine an available agent having the requisite expertise. Additional information, such as agent desktop (e.g., node 210) URL addresses (e.g., browser_id and phone_id from table 250) can also be acquired. The agent transfer component 248 can transfer the caller to the identified agent, who thereafter handles the caller's problem.

As used herein, the communication node 210 can be a node communicatively linked to presence server 220, which maintains presence information concerning the node 210. The communication node includes a presentity 212 and one or more presence user agent (PUA) 214. The presentity 212 can provide presence information to a presence service. The presentity 212 can be used to model a presence being exposed and is independent of its manifestation in any user interface. In practice, the presentity 212 typically is used to uniquely identify a person.

The PUA 214 can be a means for a principle to manipulate zero or more presentities 212, where a principle is a human, a program, or a collection of users or programs that choose to appear to a presence service (provided by the presence server 220) as a single unique actor distinct from other principles.

Typically, the PUA 214 can be a computer, mobile telephone, SIP phone, two-way radio, personal data assistant, or other computing device that is used by the presentity 212. That is, the presentity 212 can use the PUA 214, which publishes information to the presence server 220 and/or which registers with the presence server 220.

The presence server 220 can collect, manage, store, and distribute presence information regarding the access, availability, and willingness to communicate with other users. The presence server 220 can enable the extension of various telecommunication service provider applications and services to include collaboration information and how best to reach people. That is, the presence server 220 provides one or more presence services.

In one embodiment, the presence server 220 can be a stand-alone, carrier-grade, IP Multimedia Subsystem (IMS) compliant server. In another embodiment, 220 a cluster of servers can be linked to create a single virtual presence server 220. Additionally, the presence server 220 can support standard presence information data format (PIDF) and rich presence information data (RPID). Communications with the presence server 220 can be based on Session Initiation Protocol (SIP) and can conform to Internet Engineering Task Force (IETF) specifications for PUBLISH, SUBSCRIBE, and NOTIFY.

In one arrangement, the presence server 220 can act as either a presence agent 222 or a proxy 224. When the presence server 220 acts as a presence agent 222, it can be aware of the presence information of the presentity 212 through some protocol means, such as an IETF compliant means. When the presence server 220 acts as a proxy 224, it can send SUBSCRIBE requests to another entity that acts as a presence agent. Numerous commercial solutions can function as presence servers 220 including, but not limited to the WEB-SPHERE presence server, CISCO unified presence server, ORACLE presence server, MICROSOFT OFFICE LIVE COMMUNICATION SERVER, and the like.

Each watcher 230, 234, and/or 238 can request presence information about one or more presentity 212 or watcher 230, 234, 238. Special types of watchers 230, 234, 238 can include a fetcher, a poller, and a subscriber. It is possible for a watcher 230, 234, 238 to define which parts of presence information (managed by presence server 220) is received using a set of configurable rules or filters 231, 235, 239.

In one embodiment, the watchers 230, 234, 238 and filters 231, 235, 239 can be configured so that each watcher 230, 234, 238 corresponds to an expertise category. An expertise category being a particular type of skill which some contact center agents possess, which is used to respond to contact center requests.

Data stores 226 and 246 can be a physical or virtual storage space configured to store digital information. Data stores 226 and 246 can be physically implemented within any type of hardware including, but not limited to, a magnetic disk, an optical disk, a semiconductor memory, a digitally encoded plastic memory, a holographic memory, or any other recording medium. Each of the data stores 226 and 246 can be a stand-alone storage unit as well as a storage unit formed from a plurality of physical devices. Additionally, information can be stored within data stores 226 and 246 in a variety of manners. For example, information can be stored within a database structure or can be stored within one or more files of a file storage system, where each file may or may not be indexed for information searching purposes. Further, data stores 226 and 246 can utilize one or more encryption mechanisms to protect stored information from unauthorized access.

The components of system 200 can be communicatively linked to each other via a network (not shown). The network can include any hardware/software/and firmware necessary to convey data encoded within carrier waves. Data can be contained within analog or digital signals and conveyed though data or voice channels. The network can include local components and data pathways necessary for communications to be exchanged among computing device components and between integrated device components and peripheral devices. The network can also include network equipment, such as routers, data lines, hubs, and intermediary servers which together form a data network, such as the Internet. The network can also include circuit-based communication components and mobile communication components, such as telephony switches, modems, cellular communication towers, and the like. The network can include line based and/or wireless communication pathways.

Figure 3:
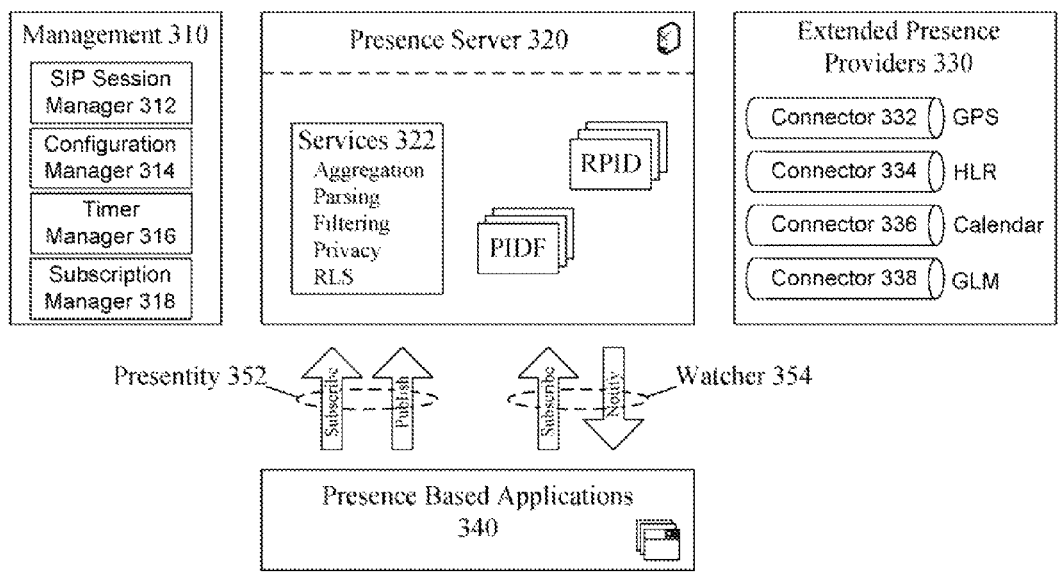
FIG. 3 is a schematic diagram illustrating a system for a presence server that performs skills based routing for a contact center in accordance with an embodiment of the inventive arrangements disclosed herein.

FIG. 3 is a schematic diagram illustrating a system 300 for a presence server 320 that performs skills based routing for a contact center in accordance with an embodiment of the inventive arrangements disclosed herein. System 300 can be one particular arrangement for the presence server 220 of system 200.

The presence server 320 can function as a presence agent or a SIP proxy. Further, the presence server 320 can provide presence information to many different applications which include a contact center. The presence server 320 can provide numerous services 322 including aggregation, parsing, filtering, privacy, and resource list server (RLS) services. Software developers can write SIP servlets to add new services 322 or to modify behavior of existing services 322 as necessary.

Presence information used by the standards based presence server 320 can conform to a number of open standards defined by organizations such as the Internet Engineering Task Force (IETF). For instance, information can be stored in a Presence Information Data Format (PIDF), a Rich Presence Information Data Format (RPID), and the like. PIDF defines a basic format for representing presence information for a presentity, which includes elements for a textual note, an indication of availability (open or closed), and a Uniform Resource Identifier (URI) for communication. The RPID format adds elements to the PIDF that provide additional information that can be translated into call routing behavior or that can be delivered to watchers. RPID information is designed so that much of the information can be derived automatically, such as from calendar files or user activity.

Management 310 functions can be performed by a SIP session manager 312, a configuration manager 314, a timing manager 316, and a subscription manager 318. The SIP session manger 312 can manage multiple simultaneous SIP based communication sessions, where sessions can include voice content, video content, chat content, interactive game content, Web content, virtual reality content, and the like.

The configuration manager 314 can permit an authorized user to configure parameters and details for communication sessions in which presence information is handled by the presence server 320. The timer manager 316 can manage a frequency through which presence information is updated from presentities 352 and a frequency through which watchers 354 are provided event package updates. The subscription manager 318 can handle subscriptions established between the presence server 320 and the watchers 354.

The presence server 320 can publish presence information, such as location, availability, capability, role, etc., to extended presence providers 330, that can serve Web pages and that provide Web services. A set of connectors 332-338 can link providers 330 to the presence server 320. For example, connector 332 can connect to a global positioning system (GPS) component; connector 334 can connect to a home location register (HLR) component; connector 336 can connect to a calendar component; and, connector 338 can connect to a Group and List Management (GLM) component.

Presence based applications 340 executing on computing devices linked to the presence server 320 can use the publish/subscribe/notify capabilities of the presence server 330. For example, presentities 352 can publish information to the presence server and can also subscribe to receive presence information concerning other presentities 352. Watchers 354 can subscribe to presentities monitored by the presence server 320 and can receive notifications when changes occur related to the presentity to which the subscription relates.

Each watcher 354 can be used to watch particular event packages of presence server 320. A watcher 354 can have a listener on an event package. That is, a listener can be used to inform the associated watcher 354 for a change and can convey a copy of a new event package which includes the changed information to the watcher 354 whenever a change is detected. Changes are published from presentities 354 using PUAs. The presence server 320 can iteratively cycle through subscriptions and can send event packages as necessary using the listener/watcher 354 design.

A series of rules can be established in the presence server 320 for each presentity 352 and watcher 354. For example, each watcher 354 can establish a watcher specific rule, such as to receive only a subset (e.g., filter) of an event package. System 300 uses the ability to establish watcher 354 specific rules to change the typical paradigm of how a watcher 354 is used. As conventionally used, there is at least a one-to-one correspondence between watchers 354 and presentities 352. Therefore, if there are ten users registered with the presence server 320, ten watchers 354 or more will be used, one for each user. Additional watchers 354 can be assigned to a single user, assuming that different filters apply to each so that different user specific watchers are only concerned with a subset of user information defined by the filter.

For skills based routing in a contact center, each watcher 354 can be established to watch a particular expertise field, where an expertise corresponds to a contact center agent skill. For example, an expertise code of one ("expertise=1") can indicate that an associated agent has expertise in product warrantee. If ten agents are registered with the presence server 320 and a contact center has five categories of expertise, then five watchers 354 can be established, one for each category of expertise. Additionally, each of the ten agents can have multiple skills, which places that agent on a list of agents maintained by multiple ones of the expertise-based watchers 354. Accordingly, each watcher 354 can watch all agents, but can listen to one particular item in an event package (e.g., an expertise field). Whenever a contact center needs an agent to handle a product warranty call, the watcher 354 associated with that expertise can be queried, which watches all agents having the product warranty skill.

Additionally, filters can be applied to the watcher 354 to further refine a caller's needs. For example, different inquiries can require different levels of skills in a particular expertise field. Agent skill levels can be maintained by the presence server and only those agents having a skill level that meets or exceeds the level needed for a caller request will be considered for agent transfer purposes. Different filters in the watcher 354 and/or the presence server 320 can be used to add any level of complexity to the routing of calls to agents. Accordingly, unlike conventional call center agent transfer capabilities, which are implemented using proprietary load balancing and transfer code and have limited configurable options, system 300 is based upon flexible open standards that make it relatively easy to customize system 300 for business specific behavior and business specific circumstances.

Figure 4:
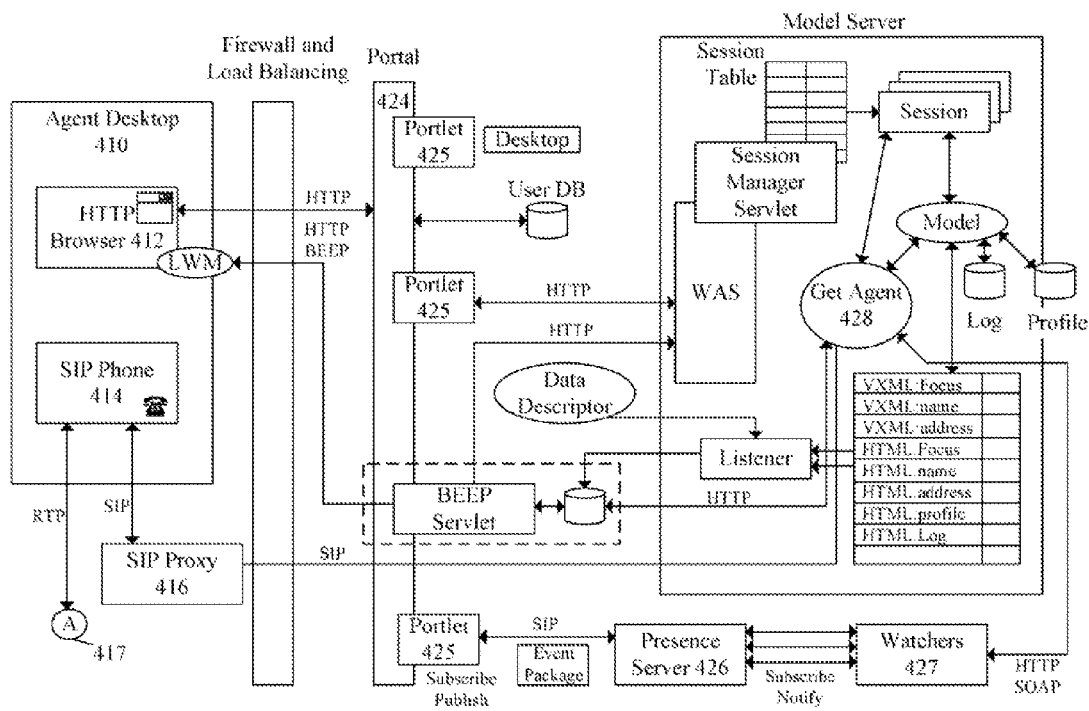
FIG. 4 is a schematic diagram of a standards based contact center from an agent perspective that is implemented using WEBSPHERE enabled components and associated tooling in accordance with an embodiment of the inventive arrangements disclosed herein.

FIG. 4 is a schematic diagram of a standards based contact center 400 from an agent perspective that is implemented using WEBSPHERE enabled components and associated tooling in accordance with an embodiment of the inventive arrangements disclosed herein. Center 400 represents one particular embodiment for system 200. It should be noted that center 400 utilizes WEBSPHERE enabled components for illustrative purposes only and the scope of the invention is not to be construed as limited in this regard. Other middleware solutions and open standards based solutions can be substituted and adapted to achieve approximately equivalent results.

An illustrative scenario for center 400 can show how the components interact. In this scenario, a call can come in over a telephone to the contact center 400 using a standard telephone, where the call is transferred to an agent connected to contact center components using agent desktop 410. The agent can utilize any personal computer in an operations center as the agent desktop 410 and is not trained to a particular station. The agent can also remotely (i.e., external to an operations center, such as through a home computer) connect to contact center components using a Web browser 412 and SIP based telephone 414. The agent can sign onto portal 424 via an agent desktop portlet 425. For example, the agent can enter a user id and password and hit a SUBMIT button.

The desktop agent portlet can call the WEBSPHERE PRESENCE SERVER (WPS) 426 with a publish/subscribe mechanism. An IP address of the agent's SIP phone 414, browser 412, Blocks Extensible Exchange Protocol (BEEP) address, and other information including agent expertise and agent utilization can be conveyed to the presence server 426. After login onto the system, a default screen can be presented in the browser 412 that indicates that the agent is active and available.

It should be emphasized that use of a LOTUS Lightweight Messaging (LLM) client and the BEEP protocol is just one contemplated technique for communicating with the agent desktop and that the invention is not to be limited in this regard. That is, any of a variety of other techniques can be substituted that provide approximately equivalent function to LLM and BEEP. For example, Asynchronous JavaScript and XML (AJAX) based clients using HTTP can establish communications with the agent desktop in one contemplated embodiment.

Watchers 427 can be plugged into the presence server 426 for items of interest to the contact center. One item of interest can be agent expertise and there can be a one-to-one correspondence between watchers 427 and expertise. When the agent logs onto the contact center 400, he/she registers with the presence server 426. The presence server 426 can update watcher 427 information so that those watchers associated with expertise(s) of the logged in agent are informed that a new agent having this expertise is available for receiving calls.

At this time, a call between a caller on a phone and the contact center 400 can be active. In a running Voice XML (VXML) application, the WEBSPHERE Voice Enabler (VE) can prompt a user for input. The VE can interact with the WEBSPHERE VOICE SERVER to determine user context information and a purpose of a call. The purpose of the call can be associated with an expertise category. The caller responses can indicate that agent assistance is needed, for example, a caller can select a dialog option to speak with a live agent.

The VXML application can transfer the caller to an agent transfer servlet co-located with the SIP proxy 416. For example, the get agent 428 function can be executed for a particular expertise, such as "expertise=1". A watcher 427 associated with expertise=1 can be contacted. A further filter (i.e., a load balancing filter) can be applied to the watcher 427 that filters based on a usage criteria. For example, the least used agent can be granted priority by the load balancing filter. Other load balancing filters can be used and the invention is not to be construed as limited in this regard.

For instance, filters for selecting an agent having the needed expertise can utilize criteria of any complexity. Filtering criteria can include, but is not limited to, a length of time of an agent in a watcher list a category of watcher (i.e., dedicated agent or independent knowledge broker), a customer satisfaction rating for interactions with the agent, a skill level in the expertise category of the agent, an estimated wait time for an agent based upon a current queue, and the like. Accordingly, contact centers can customize agent selection in numerous business specific manners to improve customer satisfaction, to decrease costs to a business, to minimize wait time, and/or to achieve other business objectives.

Once the transfer is made, the agent can receive the call using the SIP phone 414 and can receive caller specific data via the browser 412. The communication can include the SIP proxy 416 and/or a real time protocol (RTP) connection direct to the caller 417.

It should be noted that middleware programming interface of contact center 400 allows for custom services to be created for contact center operations. These services can be provided by the middleware provider and/or by third party providers, which include traditional vendors of contact center solutions. The presence server 426 subscription function permits the dynamic registration of agents and agent capabilities. Further, the rich presence function of the server 426 can permit real-time status metrics on agent operations. Generally, contact center 400 encourages the interoperation of services provided by different sources, which permits the contact center 400 to gracefully evolve and to use best practices and applications tailored to the specific needs of the business or organization for which the contact center 400 is implemented.

Further, the arrangements of contact center 400 permit knowledge brokering and independent agent services to be provided to a multitude of business entities. That is, agents can operate as independent knowledge brokers, who sell their knowledge and services in a manner analogous to how goods/merchandise is sold today. Thus, contact center 400 can connect people with knowledge to sell, such as doctors, lawyers, and other professionals, to those willing to pay for this knowledge (i.e., callers or communicators contacting the call center). Businesses can utilize these independent contractors to handle difficult problems that dedicated staff is unable to handle, to handle overflow to ensure that queue wait times remain under a configurable duration, and to offer an unprecedented level of contact center flexibility. The open standards based nature of center 400 permits the seamless integration of independent knowledge brokers and dedicated personnel in a fashion transparent to callers. In short, higher quality contact center services can be provided at less costs using center 400 than is possible using conventionally implemented contact centers.

Figure 5:
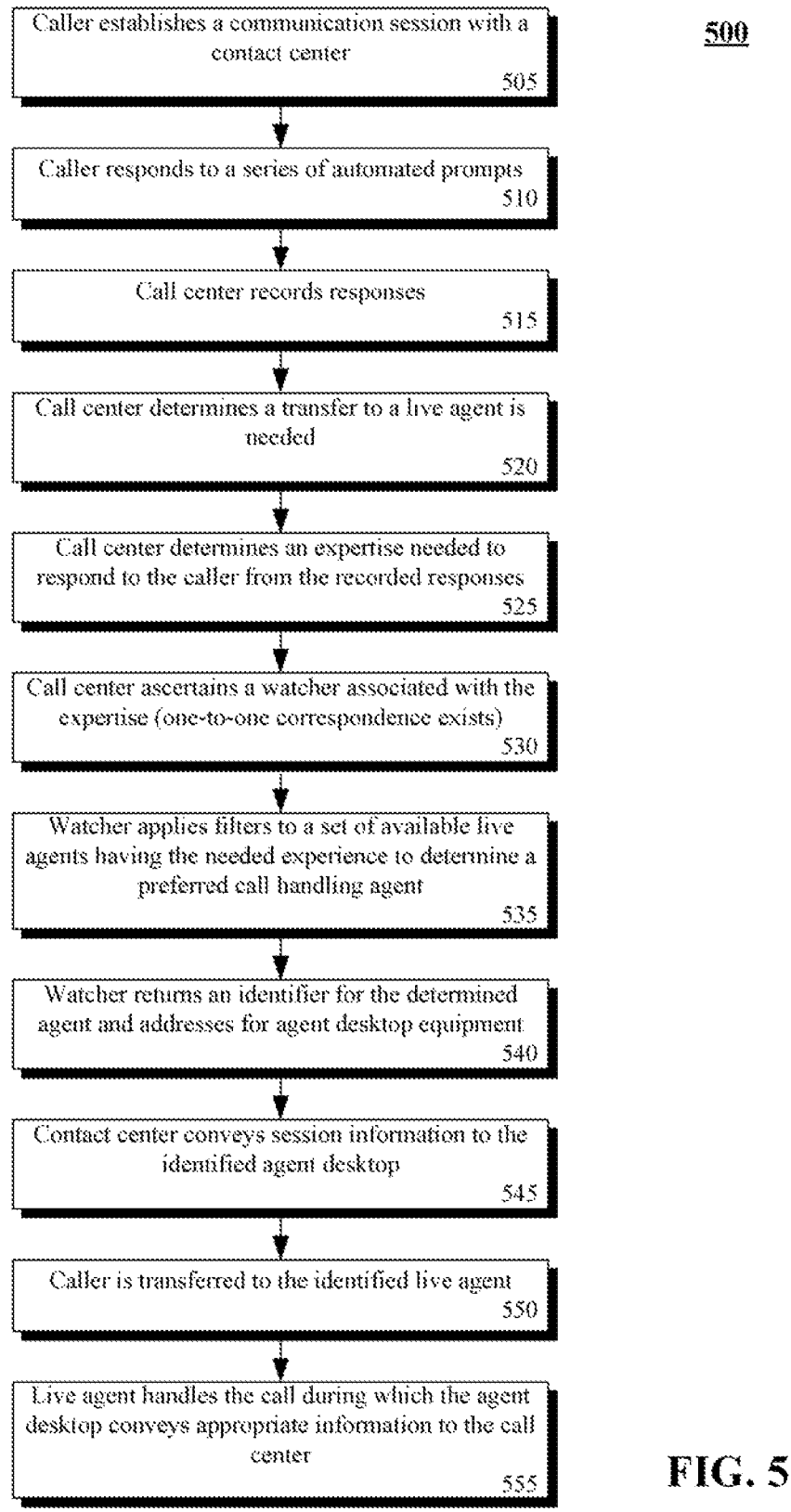
FIG. 5 is a flow chart of a method for performing skills based routing for a call center using a set of watchers and a presence server, where each of the watchers watch a particular expertise.

FIG. 5 is a flow chart of a method 500 for performing skills based routing for a call center using a set of watchers and a presence server, where each of the watchers watch a particular expertise. The method 500 can be performed in the context of a call center, such as the center shown in system 200.

Method 500 can begin in step 505, where a caller can establish a communication session with a contact center. The caller can respond to a series of automated prompts, as shown by step 510. In step 515, the call center can record prompt responses. In step 520, the call center can determine that a transfer to a live agent is needed. The call center can determine an expertise needed to respond to the caller based upon the recorded prompt responses, as shown by step 525. In step 530, the call center can ascertain a watcher associated with the needed expertise. Appreciably, a set of watchers can be established that subscribe to presence information maintained by a presence server, where each watcher in the set corresponds to an expertise. Each live agent having that expertise is watched by that watcher. Accordingly, a one-to-one correspondence can exist between watchers and expertise categories.

In step 535, the watcher can apply one or more filters to the watcher-specific set of live agents, each of which has the expertise associated with the watcher. In step 540, the watcher can return an identifier for the live agent and addresses for agent desktop equipment. For example, the agent desktop can include a SIP phone and a browser, and the addresses can be Uniform Resource Identifiers (URIs) for the phone and browser respectively. In step 545, the contact center can convey session information, which includes the previously recorded responses, caller identifying information, and the like, to the identified agent desktop. In one embodiment, the information can be presented within agent specific portlets served by a portal server. In step 550, the caller can be transferred to the identified live agent. The live agent can handle the call in step 555. During this call, the agent desktop can convey appropriate information to the call center, such as session metrics, call resolution details, and the like.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A presence management system for a contact center comprising:

a presence server that accepts, manages, and distributes presence information using Session Initiation Protocol (SIP) based messages and in conformance with an open standard;

a data store communicatively linked to the presence server, wherein the data store contains and stores the presence information, said stored presence information including presence information for each of a plurality of contact center agents, at least one of the contact center agents being an independent contractor, wherein for each agent the stored presence information includes an element indicating at least one expertise of the associated agent;

a plurality of watchers each configured to subscribe to the presence information managed by the presence server, wherein each of the watchers corresponds to a unique expertise and wherein each watcher is associated with the presence information for all of the contact center agents of the plurality of contact center agents having the unique expertise to which that watcher corresponds; and a plurality of watcher specific filters, each associated with one of the watchers, said watcher specific filters including configurable parameters for determining which of the associated live agents is to handle a communication requiring the expertise category to which that watcher corresponds, wherein load balancing among the associated live agents is performed by an appropriate one of the watcher specific filters, and wherein the load balancing causes the corresponding watcher to select the at least one independent contractor when a queue wait time for a queue exceeds a preselected threshold.

2. The presence management system of claim 1, wherein a one-to-one correspondence exists between watchers and unique expertise values.

3. The presence management system of claim 1, wherein a filter associated with each watcher is used to return a least used one of a set of contact center agents associated with the watcher whenever an agent request is conveyed to the watcher.

4. The system of claim 1, wherein the open standard is an Internet Engineering Task Force (IETF) based standard, and wherein the presence server provides operations for PUBLISH, SUBSCRIBE, and NOTIFY.

5. The system of claim 1, wherein the presence server supports standard presence information data format (PIDF) and rich presence information data (RPID).

6. The system of claim 1, wherein the presence server and watchers are used to handle skills based routing functions for a standards based contact center implemented in accordance with a service oriented architecture (SOA).

7. A contact center comprising:
a plurality of contact center components conforming to open standards that intercommunicate utilizing open standards, said components together forming an open contact center, said open contact center providing automated interactive communications with callers, providing queue management for callers waiting to communicate with live agents, and providing skills based routing for assigning live agents to callers based upon an expertise possessed by the live agents and an expertise needed by the callers, wherein a plurality of defined expertise categories are defined for the skills based routing, and where at least one of the live agents is an independent contractor;

a presence server that accepts, manages, and distributes presence information of each of the live agents using Session Initiation Protocol (SIP) based messages and in conformance with an open standard, wherein the presence information for each of the live agents includes an indication of at least one expertise category for the associated live agent;

a plurality of watchers configured to subscribe to the presence information managed by the presence server, wherein a one-to-one correspondence exists between the watchers and expertise category, and wherein the watchers and presence server are used in providing the skills based routing;

a plurality of watcher specific filters, each associated with one of the watchers, said watcher specific filters including configurable parameters for determining which of the associated live agents is to handle a communication requiring the expertise category to which that watcher corresponds, wherein load balancing among the associated live agents is performed by an appropriate one of the watcher specific filters, and wherein the load balancing causes the corresponding watcher to select the at least one independent contractor when a queue wait time for a queue exceeds a preselected threshold.

8. The contact center of claim 7, wherein the presence server communicates using Session Initiation Protocol (SIP) based messages in conformance with an Internet Engineering Task Force (IETF) based standard, and wherein the presence server provides operations for PUBLISH, SUBSCRIBE, and NOTIFY.

9. The contact center of claim 7, wherein the contact center components intercommunicate via an enterprise service bus (ESB).

10. The contact center of claim 7, wherein each of the contact center components are service oriented architecture (SOA) components.

11. The contact center of claim 7, wherein each of the contact center components execute within a middleware solution having IP Multimedia Subsystem (IMS) capabilities.

12. The contact center of claim 7, further comprising:
an agent desktop comprising an HTTP browser and a SIP based phone each based upon open standards, wherein the agent desktop is configured to operate as an interface between the live agent and the contact center and wherein the presence information includes a SIP address for the SIP based phone and an internet protocol (IP) address for the HTTP browser.

13. The contact center of claim 7, further comprising:
a composite services model server configured to maintain session and model information for communications between the live agents and the callers.

14. A method for performing skills based routing for a contact center comprising:
a call center interacting with a caller using an automated response mechanism;
determining that the caller is to be transferred to a live agent;
ascertaining an expertise needed based upon information acquired during the interacting step;
determining one of a plurality of watchers that corresponds to the expertise based on presence information for each of the plurality of watchers, each of the plurality of watches having an associated watcher specific filter, wherein each of the watchers uniquely corresponds to a particular expertise, wherein each watcher subscribes to the presence information, and wherein the presence information is managed by a presence server that accepts, manages, and distributes presence information related to each of the live agents using Session Initiation Protocol (SIP) based messages and in conformance with an open standard, at least one of the live agents being an independent contractor, and wherein the presence information for each live agent includes an indication of at least one expertise for the associated live agent, wherein the presence information is maintained in a data store communicatively linked to the presence server;
the watcher identifying an agent of the live agents to handle the caller based on the presence information via interaction with the presence server using the SIP based messages, wherein the identifying is performed by the watcher specific filter associated with the watcher load balancing among the live agents and selecting the independent contractor when a queue wait time exceeds a preselected threshold; and transferring the caller to the identified agent.

15. The method of claim 14, wherein a one-to-one correspondence exists between watchers and types of expertise.

16. The method of claim 14, wherein the presence server is configured to accept, manage, and distribute presence information using Session Initiation Protocol (SIP) based messages in conformance with an Internet Engineering Task Force (IETF) based standard, and wherein the presence server provides operations for PUBLISH, SUBSCRIBE, and NOTIFY.

17. The method of claim 14, wherein the call center is formed from a plurality of components that conform to open standards and that intercommunicate via an enterprise service bus (ESB).

18. The method of claim 14, wherein said steps of claim 14 are steps performed automatically by at least one machine in accordance with at least one computer program having a plurality of code sections that are executable by the at least one machine, said at least one computer program being stored in a machine readable memory.

* * * * *